(12) United States Patent
Shumsky et al.

(10) Patent No.: US 9,658,951 B1
(45) Date of Patent: May 23, 2017

(54) SCALABLE HIGH BANDWIDTH MEMORY IN A NETWORK DEVICE

(71) Applicant: Marvell Israel (M.I.S.L) Ltd., Yokneam (IL)

(72) Inventors: Evgeny Shumsky, Petah Tikva (IL); Carmi Arad, Nofit (IL); Gil Levy, Hod Hasharon (IL); Ehud Sivan, Zichron Ya'akov (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 297 days.

(21) Appl. No.: 13/666,622

(22) Filed: Nov. 1, 2012

Related U.S. Application Data

(60) Provisional application No. 61/554,902, filed on Nov. 2, 2011.

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC ...................................................... G06F 12/023
USPC .......................................................... 711/172
See application file for complete search history.

(56) References Cited

U.S. PATENT DOCUMENTS

| | | | |
|---|---|---|---|
| 6,088,745 A | 7/2000 | Bertagna et al. | |
| 6,757,803 B1 | 6/2004 | Lin et al. | |
| 7,948,976 B2 | 5/2011 | Arad et al. | |
| 7,991,926 B1 | 8/2011 | Arad | |
| 8,005,079 B1 | 8/2011 | Walsh | |
| 8,009,689 B1 | 8/2011 | Walsh et al. | |
| 8,077,610 B1 | 12/2011 | Arad et al. | |
| 8,358,651 B1 | 1/2013 | Kadosh et al. | |
| 2002/0118204 A1* | 8/2002 | Aleksic | G06T 1/60 345/544 |
| 2002/0118692 A1 | 8/2002 | Oberman et al. | |
| 2004/0076147 A1* | 4/2004 | Loge | H04L 12/5601 370/386 |
| 2005/0025140 A1* | 2/2005 | Deforche et al. | 370/363 |
| 2005/0132162 A1 | 6/2005 | Reese | |
| 2005/0141516 A1 | 6/2005 | Sinha et al. | |
| 2012/0127818 A1 | 5/2012 | Levy et al. | |
| 2012/0303927 A1 | 11/2012 | Goldberg | |

OTHER PUBLICATIONS

U.S. Appl. No. 13/666,608, filed Nov. 1, 2012.
Office Action in U.S. Appl. No. 13/666,608, dated Nov. 4, 2015 (16 pages).

(Continued)

*Primary Examiner* — Larry Mackall

(57) ABSTRACT

In a method for storing packets in a network device, a processor and a plurality of memory banks for storing packet data during processing of packets by the processor are provided on an integrated circuit device. Each memory bank has a separate channel for transferring data. A plurality of buffers are defined such that each buffer in the plurality of buffers includes a respective memory space in more than one memory bank and less than all memory banks. A buffer of the plurality of buffers is allocated for storing a single packet or a portion of a single packet. The single packet or the portion of the single packet in the allocated buffer.

20 Claims, 4 Drawing Sheets

(56) References Cited

OTHER PUBLICATIONS

Office Action in U.S. Appl. No. 13/666,608, dated Jun. 16, 2016 (18 pages).
Office Action in U.S. Appl. No. 13/666,608, dated Oct. 6, 2016 (18 pages).

* cited by examiner

SCALABLE HIGH BANDWIDTH MEMORY IN A NETWORK DEVICE

CROSS-REFERENCE TO RELATED APPLICATION

This disclosure claims the benefit of U.S. Provisional Patent Application No. 61/554,902, filed Nov. 2, 2011, entitled "Scalable High Bandwidth Memory For Switches and Routers," the disclosure of which is hereby expressly incorporated herein by reference in its entirety.

The present application is related to U.S. patent application Ser. No. 13/666,608, entitled "Scalable Dynamic Memory Management in a Network Device," filed on the same day as the present application, and hereby incorporated by reference herein in its entirety.

FIELD OF THE DISCLOSURE

The present disclosure relates generally to communication networks and, more particularly, to network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like often employ store and forward architectures in which received packets are stored in memory for subsequent transmission to desired destinations after processing. Various high performance network devices require very fast high bandwidth memories so as not to limit the rate at which packets can be processed and transmitted. Memory bandwidth needs of network devices increase dramatically in multiport devices that also include several processing cores operating in parallel which utilize a shared memory.

SUMMARY

In an embodiment, a method for storing packets in a network device includes providing on an integrated circuit device, a processor and a plurality of memory banks for storing packet data during processing of packets by the processor, wherein each memory bank has a separate channel for transferring data. The method also includes defining a plurality of buffers, wherein each buffer in the plurality of buffers includes a respective memory space in more than one memory bank and less than all memory banks. The method further includes allocating a buffer of the plurality of buffers, the buffer for storing a single packet or a portion of a single packet, and storing the single packet or the portion of the single packet in the allocated buffer.

In another embodiment, a network device comprises a port configured to receive packets from a network and an integrated circuit including at least one processor and a plurality of separate memory banks that collectively provide a memory space for storing packet data during processing by the at least one processor, wherein each separate memory bank is coupled to the at least one processor by a separate channel from transmitting data. The network device also comprises a plurality of buffers defined in the memory space, each buffer formed of a respective memory space in more than one separate memory bank and less than all of separate memory banks. The memory device further comprises a memory management unit configured to allocate a buffer for storing a single packet or a portion of a single packet received at the port.

DETAILED DESCRIPTION

Example methods and apparatus are described herein in the context of Ethernet networks. One of ordinary skill in the art will recognize, in light of the disclosure and teachings herein, that similar methods and apparatus are suitable for use in other suitable communication networks as well. For explanatory purposes, example memory devices are described in the context of high bandwidth, multi-port switches for processing packets transmitted over a communication network. It is noted, in light of the disclosure and teachings herein, that similar methods and apparatus for memory sharing are suitable wherever several client devices, such as processors, processor cores, circuits, pipeline stages, etc., need to simultaneously perform memory operations, such as a read operation or another suitable operation, on a shared memory. The described shared memory apparatus methodologies are not limited to use in communication network devices, but rather may be utilized in other suitable contexts as well.

Figure 1:
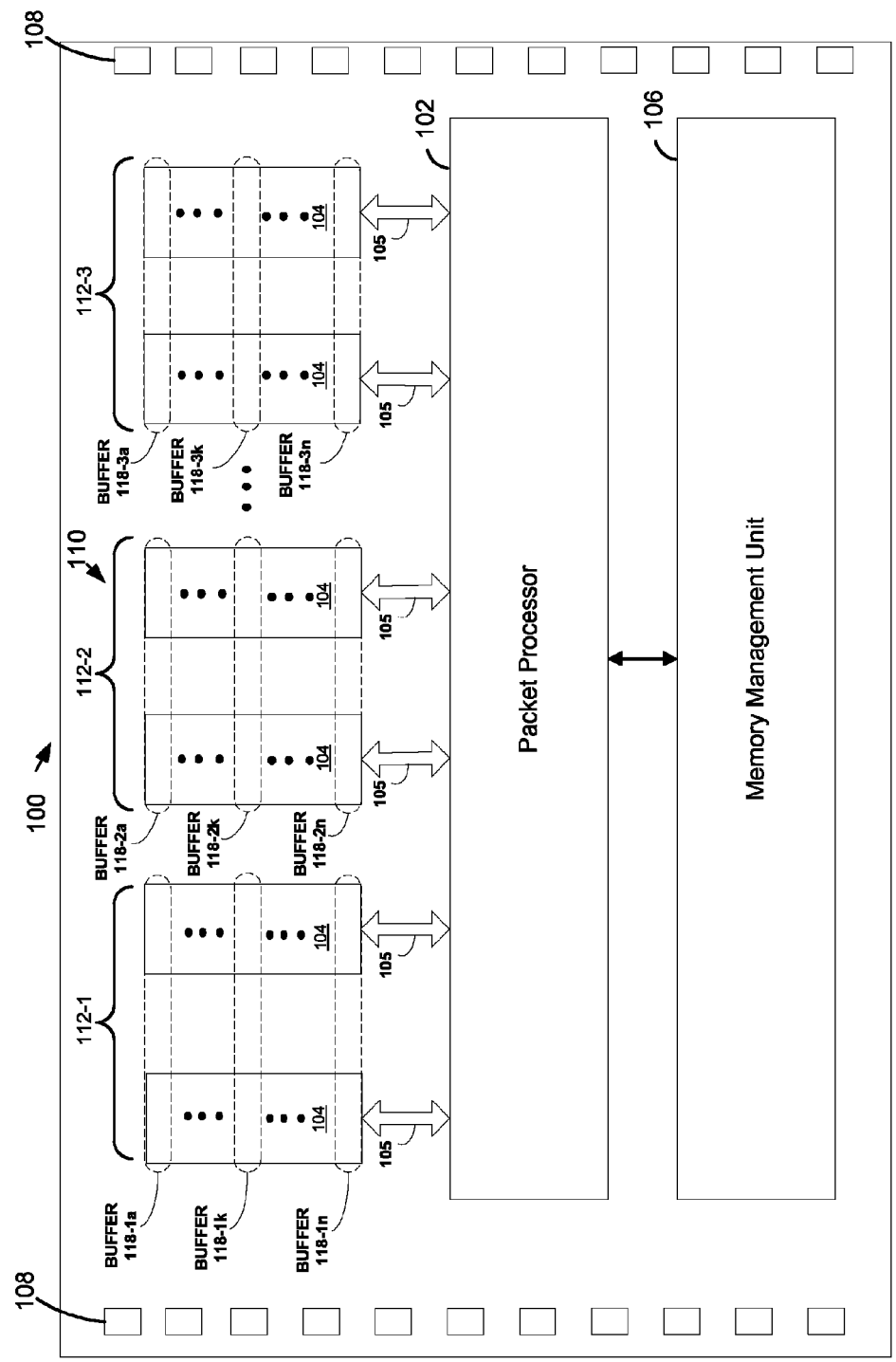
FIG. 1 is a block diagram of an example network device that includes a plurality of memory banks, according to an embodiment.

FIG. 1 is a block diagram of an example network device 100, such as a Layer-2, a Layer 3, a hybrid Layer2/Layer3 switch, or the like, according to an embodiment. The network device 100 includes a packet processor 102 and a plurality of ports 108, with each port 108 coupled to a respective communication link associated with a communication network. The network device 100 further includes a plurality of separate memory banks 104 that collectively provide a memory space 110 utilized by the packet processor 102 for storing packets received by the network device 100. In general, the packet processor 102 is configured to process packets received via the ports 108, to store the received packets in the memory banks 104, to determine respective ports 108 via which the packets should be subsequently transmitted, and to retrieve the packets from the memory banks 104 for transmission via the determined ports 108, in an embodiment. Although the network device 100 includes a single packet processor 102 in the embodiment illustrated in FIG. 1, the network device 100 includes more than one packet processor 102 in other embodiments. A multi-core network device that includes several processing cores, according to one embodiment, will be described in more detail below in connection with FIG. 2.

In an embodiment, each memory bank 104 is a suitable physical memory device coupled to the packet processor 102 via a respective data channel 105, allowing the packet processor 102 to transfer data to and/or from multiple ones of the memory banks 104 in an essentially simultaneous, overlapping or concurrent fashion (e.g., in a single clock cycle). The memory banks 104 are each separate on-die memory banks that along with their respective data channels 105 are disposed within the same integrated circuit as the packet processor 102, in an embodiment. In another embodiment, at least some of the memory banks 104 and/or the packet processor 102 are disposed on different solid state devices, such as on different integrated circuits.

To provide efficiently sized buffers in the memory space 110, in an embodiment, a plurality of buffers 118 are defined in the memory space 110 such that each buffer 118 includes a respective memory space in each memory bank 104 in a set of memory banks 104. To this end, in an embodiment, memory banks 104 are divided into memory bank sets 112-1, 112-2 and 112-3, and a set of buffers 118 is defined to span each memory bank set 112. In other words, the memory space 110 is configured such that a buffer 118 in the memory space 110 is distributed among several memory banks 104, in this embodiment. For example, each buffer in the set buffer set 118-1 spans the memory banks 104 included in the memory bank set 112-1, each buffer in the buffer set 118-2 spans the memory banks 104 included in the memory bank set 112-2, and each buffer in the buffer set 118-3 spans the memory banks 104 included in a memory bank set 112-3, in the illustrated embodiment. It is noted that although memory bank sets 112 are illustrated to include contiguous memory banks 104, this need not be the case, and a memory bank set 112 includes at least some non-contiguously ordered memory banks 104 in some embodiments. In any event, because a buffer 118 in the memory space 110 is distributed over multiple memory banks 104, when a packet is written to a buffer in the memory space 110, chunks of the packet are stored in different memory banks 104, in at least some situations. However, because a buffer 118 that spans two or more separate memory banks 104 is defined as an integral unit utilized by the packet processor 102 for storing data in several memory banks 104, the packet processor 102 is capable of storing packet data in a buffer (e.g., associated with a buffer identifier) in the memory space 110 without separately addressing or identifying the particular memory banks 104 and/or the particular memory chunks in the memory banks 104 in which the packet is stored in the memory space 110, according to an embodiment.

The memory management unit 106 is configured to manage the memory space 110 by dynamically allocating buffers in the memory space 110 for storing variable length packets received by the network device 100, according to an embodiment. To this end, in an embodiment, the memory management unit 106 maintains information regarding occupied and available buffers 118 in the memory space 110, and allocates one or more available buffers for storing a packet depending on the size of the packet. It is noted that the memory management unit 106 is not coupled to the memory banks 104, but manages the memory space 110 by maintaining information regarding free and allocated space in the memory space 110, in an embodiment. In operation, the packet processor 102 receives a packet to be stored in the memory space 110 and requests one or more buffers to be allocated for storing the packet, for example by sending one or more allocation requests to the memory management unit 106. The memory management unit 106, upon receiving the allocation request from the packet processor 102 allocates a buffer (e.g., from a list or queue of free, or available, buffers 118 maintained by the memory management unit 106), and sends an allocation response indicating the allocated buffer to the packet processor 102, according to an embodiment. Upon receiving an allocation request from the processor 102, the memory management unit 106 allocates a buffer 118 and sends an allocation response to the packet processor 102 indicating the allocated buffer 118 to the packet processor 102, for example by providing a buffer identifier (e.g., a buffer number) to the packet processor 102. It is noted that the memory management unit 106 treats each buffer 118 as if the buffer 118 is an integral unit, even though respective buffers 118 comprise physical memory spaces that are located in different ones of memory banks 104 and that are respectively accessed via different ones of the data channels 105.

Once a buffer 118 is allocated for storing a packet, the packet processor 102 stores at least a portion of the packet in the memory space 110 by writing at least a portion of the packet to the allocated buffer 118. To this end, the packet processor 102 divides the packet into one or more packet chunks, and transfers the one or more packet chunks via respective data channels 105 to the corresponding respective memory banks 104 for storage the one or more packet chunks in the one or more allocated buffers 118, in an embodiment. In general, once allocated for storing a packet, a buffer 118 is only used for storing the packet for which the buffer 118 is allocated, in an embodiment. In other words, a buffer 118 allocated for storing a packet cannot be used for storing packet data associated with a different packet, in this embodiment. Thus, in this embodiment, if a packet (or a portion of a packet) is not large enough to fill an allocated buffer 118, a portion of the allocated buffer 118 then remains unused.

In an embodiment, each of the memory banks 104 is disposed on an integrated circuit (IC) or other suitable solid-state device In some embodiments, the packet processor 102 is disposed on the same IC or other suitable solid-state device on which the memory banks 104 are also disposed. Alternatively, in another embodiment, the memory banks 104 and the packet processor 102 are disposed on multiple integrated circuits or multiple other suitable solid-state devices.

Figure 2:
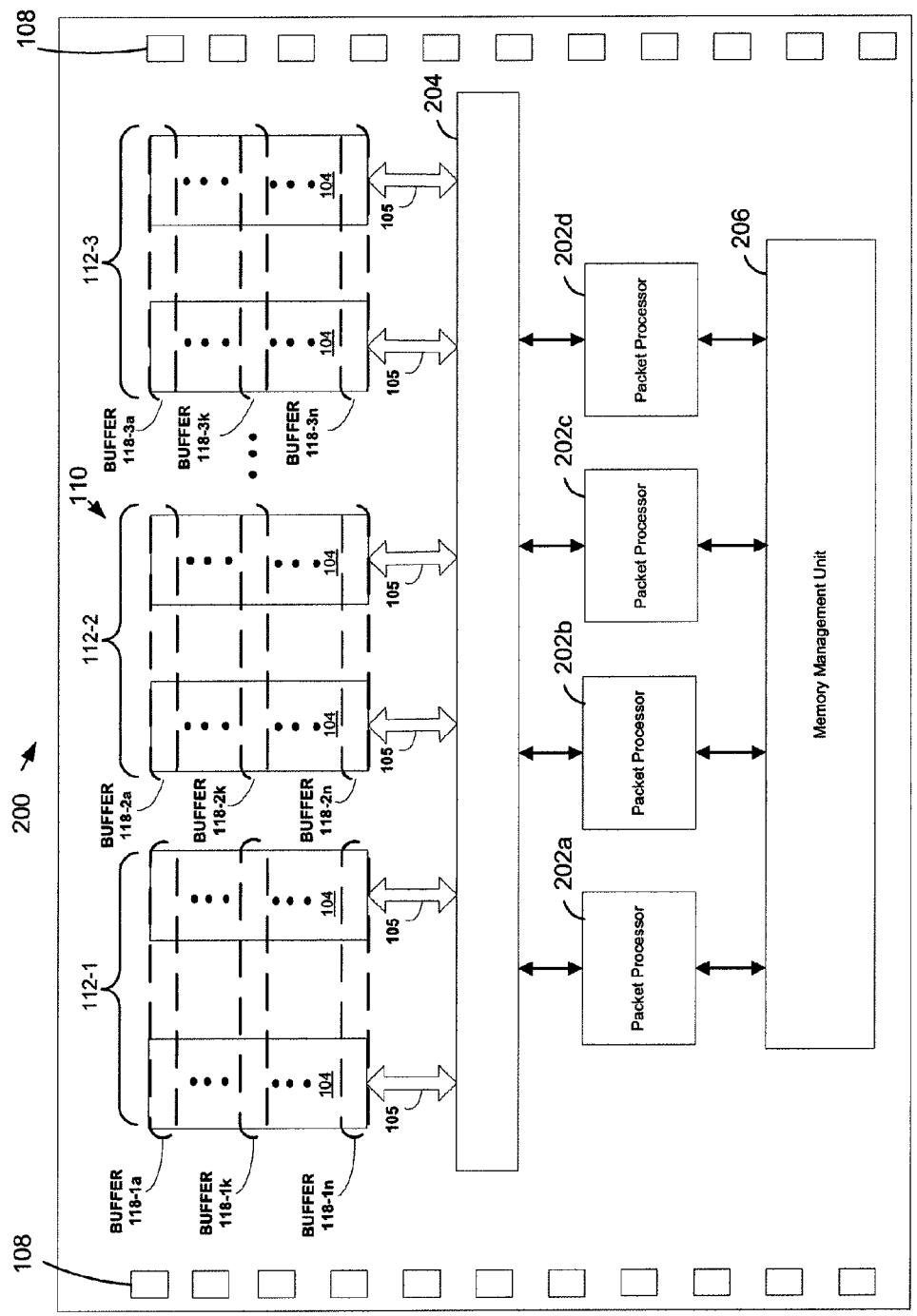
FIG. 2 is a block diagram of another example network device that includes a plurality of memory banks, according to another embodiment.

FIG. 2 is a block diagram of an example multi-core network switch 200, according to an embodiment. The network switch 200 is generally similar to the network switch 100 of FIG. 1 and like-numbered elements are not discussed for the purpose of conciseness. The network switch 200 includes a plurality of client devices or packet processors (or "packet processor cores") 202, and each of the memory banks 104 provided in the network device 200 is coupled, via a respective data channel 105, to a memory interface unit 204. The memory interface unit 204 allows each of the client devices 202 to access the memory banks 104 via the respective data channels 105. Thus, in this embodiment, the memory space 110 provided by the memory banks 104 is shared among the client devices 202. In the network device 200, each client device 202 generally acts as a client that generates requests to perform memory operations in the memory space 110. The term "client," as used herein, refers to a device configured to generate requests to perform memory operations in a memory space in a network device. The network device 200 further includes a memory management unit 206 that generally function the same as or similar to the memory management unit 106 of FIG. 1, in at least some embodiments. The memory management unit 206, however, is configured to receive allocation requests from the multiple client devices 202 and to allocate buffers 118 in response to receiving the allocation requests from multiple client devices 202. In an example embodiment, the memory management unit 206 operates as described in U.S. patent application Ser. No. 13/666,608. In another embodiment, the management unit 206 operates in another suitable manner.

Although the memory banks 104 are discussed above as being included the network device 100 (or the network device 200), similar memory structures may be utilized in other types of computing systems such as personal computers, servers, mainframes, smart phones, gaming systems, set top boxes, communication equipment, etc. For example, a computing system may include one or multiple devices, such as central processing units, coprocessors, special-purpose processing units, circuits, pipeline stages, etc.) that each utilizes a memory space structured same as or similar to the memory space 110.

In various embodiments, the number of the memory banks 104 provided in a network device (e.g., the network device 100 of FIG. 1 or in the network device 200 of FIG. 2) depends on the particular memory bandwidth required or desired in the network device. Further, increasing the number of memory banks 104 in the network device increases the memory bandwidth of the network device, i.e. by increasing the bandwidth for storing packets in memory and retrieving packets from memory, in at least some embodiments. In general, the memory bandwidth of a network device that includes a plurality of memory banks is determined by:

$$\text{total memory } BW = N*BW \quad \text{Equation 1}$$

where N is the number of memory bank, and BW is the memory bandwidth of each of the memory banks. Referring to FIG. 2, the number of client devices 202 is generally greater than or equal to the number of memory banks 104, according to an embodiment. In this case, the client devices 202 are able to at least substantially simultaneously (e.g., during a single clock cycle) access the memory space 110 by accessing, via respective data channels 105, non-overlapping memory address ranges corresponding to different memory banks 104. In another embodiment, however, the number of client devices 202 exceeds the number of memory banks 104. In this case, the total memory bandwidth available to the client devices 104 is determined by:

$$\text{total memory } BW = F*N*BW \quad \text{Equation 2}$$

where F is an address range collision factor in the memory banks 104.

In general, a packet processor 102, 202 should be able to determine an address corresponding to the allocated buffer in the memory space 110 based on the buffer indicator (e.g., a buffer number) associated with the allocated buffer, in an embodiment. For example, when a buffer indicator associated with a buffer in the memory space 110 corresponds to a row number in a single memory bank 104, a packet processor 102 or 202 is able to determine the address of the buffer space corresponding to the allocated buffer based on the buffer number associated with the allocated buffer, in an embodiment. However, because in this case a buffer is defined to span a single row of a single memory bank 104, buffer size is determined by the width of the respective memory bank 104. In this case, retrieving packets stored in multiple buffers in the memory space 110 may be slow and inefficient, particularly when memory bank width is small. For example, when linked lists are used to link buffers in the memory space 110, then retrieving a data packet from the memory space 110 when the data packet is stored in multiple buffers in the memory space 110 requires frequent access to the linked list. The frequent access to a linked list may impact the speed of access to the memory space 110 and thus may not be suitable for packet transmission via a high speed port. Moreover, because in such architecture a buffer is tied to a single row of a single memory bank 104, increasing the number of memory banks 104 in a network device, for example to increase the memory bandwidth of the network device, also increases the total number of addressable buffers in the memory space 110. Increasing the number of buffers in the memory space 110 may also complicate memory management of the memory space 110.

Alternatively, in an embodiment, buffers are defined in the memory space 110 to span corresponding rows in all of the memory banks 104 provided in a network device. In some embodiments, however, memory design mandates avoiding the creation of a buffer size that is too large because very large buffers can result in underutilization of the storage capacity if the memory space 110. Moreover, in this case, because respective memory spaces in all of the memory banks 104, with each memory bank 104 contributing a respective data channel for increasing overall memory bandwidth, are coupled together for the purpose of defining larger individual buffers in the memory space 110, increasing the number of memory banks 104 in the network device further increases the buffer size and may result in a further reduction in utilization of memory capacity. Accordingly, in an embodiment, the diverging requirements of defining buffers as being distributed among plural separately accessible memory banks to obtain increased bandwidth needs to be balanced against creating buffers that are too large.

As discussed above, in order to efficiently utilize the memory space 110, according to an embodiment, each of the buffers 118 in the memory space 110 is defined to span more than one but less than all of the memory banks 104 provided in the network device 100. Such definition of buffers 118 as spanning plural memory banks 104, each memory bank 104 having a respective data channel 105, is an integral part of the hardware design of the memory space 110, in an embodiment. In operation, the packet processor 102 receives a data packet to be stored in the memory device 102, divides the data packet into one or more packet chunks, and stores the one or more packet chunks in one or more buffers 118 in the memory space 110. Buffer size is defined such that a buffer spans a set of two or more memory banks 104 among the memory banks 104 provided in the network device 100 to efficiently utilize the memory space 110. In other words, buffer size is selected to provide efficiently sized buffers in the memory space 110, with respective buffers having more than one access channel, in at least some embodiments. Further, in at least some embodiments, when the number of memory banks 104 in the memory space 110 is increased, for example to increase the memory bandwidth of the network device 100, buffers can be redefined such that each buffer includes memory space (and data channels) from one or more additional memory banks 104, thereby maintaining a suitably low number of buffers in the memory space 110 while also maintaining a suitably low buffer size for efficient memory utilization of the memory space 110. In other words, memory management of the memory space 110 according to at least some embodiments is easily scalable to higher memory bandwidths of the network device 100. Additionally or alternatively, in some embodiments, additional buffers are defined in the memory space provided by the increased number of memory banks 104.

Referring to FIG. 1, as an example, in some embodiments, the memory banks 104 provided in the memory device 100 are divided into a number of memory bank sets, and a set of buffers in defined to include a respective memory space in each of the memory banks 104 included in a set of memory banks 104. The number of memory bank sets is depends on the particular embodiment in which the memory space 110 is being utilized. As a specific example, in one embodiment, six memory banks 104 provided in the network device 100 are divided, for the purpose of defining buffers in the memory space 110, into two memory bank sets. Accordingly, in this embodiment, each memory bank set contains three memory banks 104. In another example embodiment in which six memory banks 104 are provided in the network device 100, the memory banks 104 are divided into three memory bank sets, with each memory bank set containing two memory banks 104. In other embodiments, other suitable numbers of memory banks 104 are provided in the network device 100 and/or the memory banks 104 are divided into other suitable numbers of memory bank sets for the purpose of defining buffers in the memory space 110. In general, N memory banks 104 provided in the network device 100 are divided, for the purpose of defining buffers in the memory space 110, into M memory bank sets, wherein N is an integer multiple of M, in at least some embodiments. Because a buffer in the memory space 110 is generally defined to include memory space in any suitable number of memory banks 104, buffer size in the memory space 110 is variable and is not tied to any particular number of memory banks 104, in an embodiment.

With continued reference to FIG. 1, according to an embodiment, upon receiving an allocation request from the packet processor 102, the memory management unit 106 allocates a buffer 118 (e.g., from a linked list or from a queue of free, or available, buffers 118 maintained by the memory management unit 106) and informs the packet processor 102 that the packet processor 102 can now write packet data to the allocated buffer 118. The packet processor 102 then at least substantially simultaneously (e.g., during a single clock cycle) writes packet data to the respective memory space in each memory bank 104 included in the allocated buffer 118 by accessing each of the memory banks 104 included in the allocated buffer 118 via a corresponding respective data channel 105, according to an embodiment. In some embodiments, data written to a buffer 118 is written to a corresponding memory space in each of the memory banks 104 spun by the buffer 118, which may be determined, for example, by the buffer identifier associated with the buffer 118. For example, in an embodiment, the buffer number of each buffer 108 corresponds to a row number in each memory bank 104 included the memory bank set from which the buffer 118 is allocated, allowing such that the memory location corresponding to a buffer can be determined based on the buffer identifier (e.g., buffer number) associated with the buffer.

Figure 3:
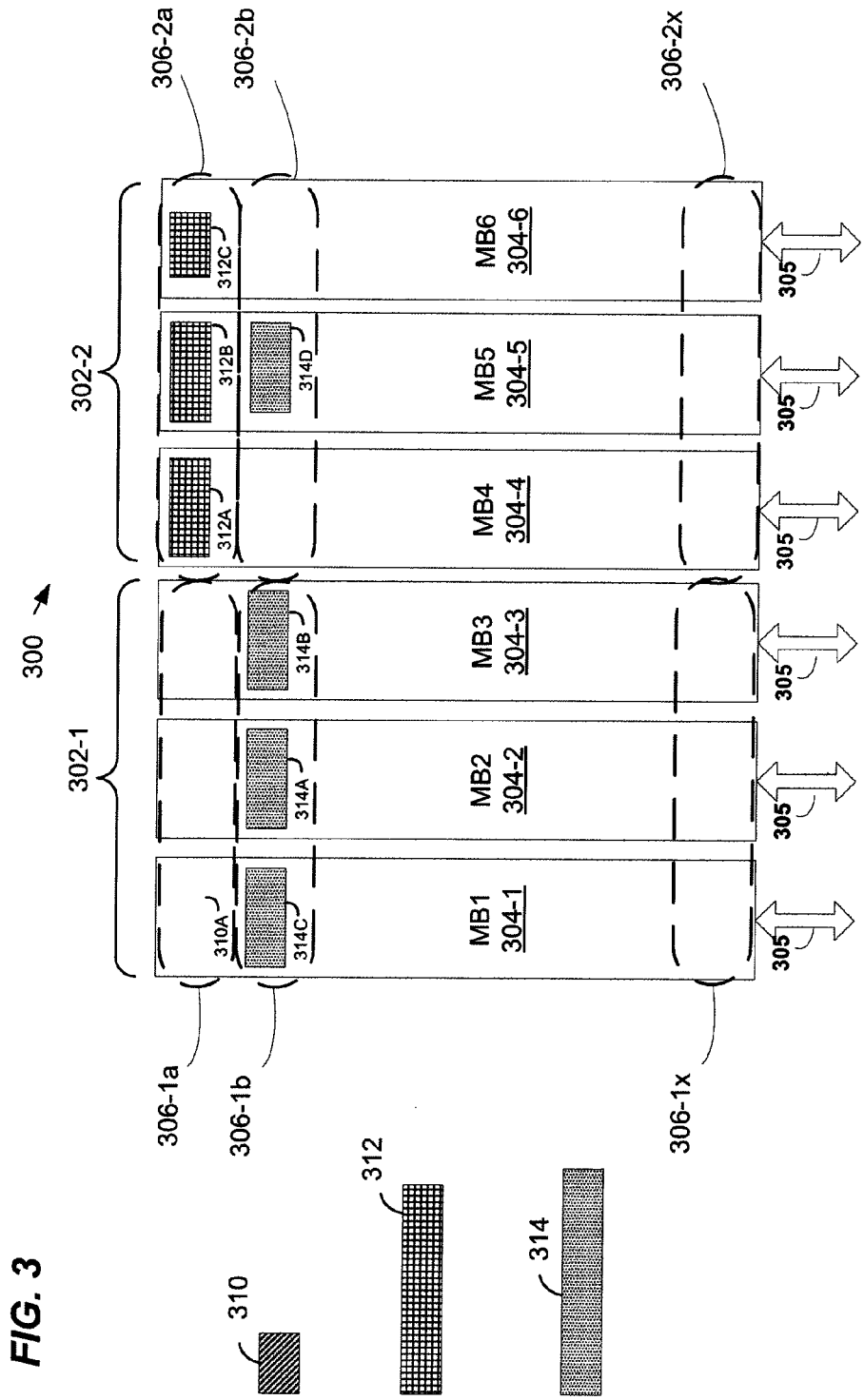
FIG. 3 is a diagram illustrating an example memory space used to store several variable length data packets, according to an embodiment.

FIG. 3 is a block diagram of an example memory structure in which a plurality of separate memory banks 304 collectively provide a memory space 300, according to an embodiment. The memory space 300 corresponds to the memory space 110 (FIG. 1, FIG. 2), in an embodiment. In another embodiment, the memory space 110 of the network device 100 (or the network device 200) is structured in a suitably different manner than the memory space 300. Similarly, a network device different than the network device 100 of FIG. 1 or the network device 200 of FIG. 2 includes a memory space structured in a suitable manner different than the memory space 300, in other embodiments. In an embodiment, the memory management unit 106 of FIG. 1 (or the memory management unit 206 of FIG. 2) is used to manage a memory space structured the same as or similar to the memory space 300 of FIG. 3. In another embodiment, the memory management unit 106 of FIG. 1 (or the memory management unit 206 of FIG. 2) is used to manage a memory space suitably structured differently than the memory space 300. For ease of explanation the memory space 300 is described below as a memory space included in the network device 100 (FIG. 1), with the memory space 300 being managed by the memory management unit 106 (FIG. 1).

In the example embodiment illustrated in FIG. 3, the memory space 300 is provided by six memory banks 304, and the memory banks 304 are divided into two memory bank sets 302-1, 302-2. Accordingly, in this embodiment, each memory bank set 302-1, 302-2 includes three of the memory banks 304. In particular, the memory bank set 302-1 includes the memory banks 304-1 through 304-3, and the memory bank set 302-2 includes the memory banks 304-4 through 304-6, in the illustrated embodiment. For each memory bank set 302, a set of buffers 306 is defined to span memory banks 304 included in the memory bank set 302, in an embodiment. As illustrated in FIG. 3, each of the buffers 306-1 spans one or more corresponding rows in each of the memory banks 304 included in the memory bank set 302-1, and each of the buffers 306-2 spans one or more corresponding rows in each of the memory banks 304 included in the memory bank group 302-2, in the illustrated embodiment. Thus, for example, the buffer 306-1a spans the first row in each of the memory devices 304-1, 304-2, 304-2 in the memory bank set 302-1, and the buffer 306-2a spans the first row in each of the memory banks 304-4, 304-5, 304-6 in the memory bank set 302-2, in an embodiment. Similarly, in an embodiment, the buffer 304-1b spans the second row in each of the memory banks 304-1, 304-2, 304-2 in the memory bank set 302-1, and the buffer 306-2b spans the second row in each of the memory banks 304-4, 304-5, 304-6 in the memory bank set 302-2, and so on. In an embodiment, each buffer 306 defined for a memory bank set 302 is associated with a respective buffer identifier (e.g., a buffer number), and each row in each memory bank 302 included in the memory bank set 302 corresponds to a respective buffer identifier. Thus, in this embodiment, memory space corresponding to (or included in) a buffer 306 in the memory space 300 is uniquely identified by a memory bank set number 302 (e.g., 302-1) and a buffer 306 (e.g., 306-1a) within the memory bank set number 302. In general, any suitable method may be used for uniquely identifying a buffer and for providing an address for a buffer, in various embodiments.

Each of the memory banks 304 includes a respective data channel 305 for communicating with the packet processor 102, in an embodiment. Thus, the packet processor 102 is capable of at least substantially simultaneously (e.g. during a same clock cycle) accessing the memory banks 304 for writing data to and/or retrieving data from a buffer that spans multiple memory banks 304. Thus, for example, the packet processor 102 is able to at least substantially simultaneously write multiple chunks of a data packet to multiple ones of the memory banks 304, in an embodiment. As illustrated in FIG. 3, several Ethernet packets 310-314 are stored in the memory space 300. A buffer 306 is used to store a single packet or a portion of a single packet, in an embodiment. If a packet fits in a single buffer 306, the packet is then stored in a single buffer 306, and any space in the buffer 306 that is not filled by the packet remains unused, in an embodiment. On the other hand, if a packet is too large to fit in a single buffer 306, then the packet is stored in multiple buffers 306. In general, multiple buffers can be used for storing portions of a same packet. However, a single buffer 306 cannot be used for simultaneously storing data belonging to different packets, in an embodiment.

In some embodiments, the memory management unit 106 is configured to allocate buffers 306 for storing variable length packets received by the network device 100 so as to maintain a balanced memory load in the memory space 300. For example, in an embodiment, the memory management unit 106 allocates buffers 306 from different ones of the memory bank sets 302 in response to consecutive allocation requests received from the packet processor 102. As an example, in an embodiment, upon receiving an allocation request from the packet processor 102, the memory management unit 106 allocates a buffer 306 from the memory bank set 302-1. Then, upon receiving the next allocation request from the packet processor 102, the memory management unit 106 allocates a buffer 306 from the memory bank set 302-2, in an embodiment. As a result, when a packet is too large to be written to a single buffer 306, the memory management unit 106 will allocate subsequent buffers 306 for storing the packet by alternating between the memory banks 302-1 and 302-2 until sufficient buffers are allocated to write the packet, in an embodiment.

Additionally or alternatively, in some embodiments, for each memory bank set 302, subsets of buffers 306 are defined such that different subsets of buffers are configured to begin in different ones of memory banks 304 in the memory banks set 302. For example, for the memory bank set 302-1, a first subset of buffers 306 is defined to begin in the memory bank 304-1 (i.e., such that the first memory bank in a buffer 306 is the memory bank 304-1), a second subset of buffers 306 is defined to begin in the memory bank 304-2 (i.e., such that the first memory bank in a buffer 306 is the memory bank 304-2), and a third set of buffers is defined to begin in the memory bank 304-3 (i.e., such that the first memory bank in a buffer 306 is the memory bank 304-3), in an embodiment. Similarly, for the memory bank set 302-2, a first subset of buffers 306 is defined to begin in the memory bank 304-4, a second subset of buffers 306 is defined to begin in the memory bank 304-5 and a third subset of buffers is defined to begin in the memory bank 304-6, in an embodiment. In an embodiment, each time the memory management allocates a buffer 306, the memory management unit 106 selects a subset of buffers from which to allocate the buffer based on the current memory load distribution in the memory space 300. For example, if the memory bank 304-1 is more heavily loaded than the memory bank 304-2, the memory management unit 106 selects a buffer 306 from the subset of buffers 306 in which the first memory bank is the memory bank 304-2, in an embodiment. Alternatively, in some embodiments, the memory management unit is configured to allocate buffers 306 from different subsets of buffers 306 in a round robin fashion, selecting each consecutively allocated buffer from a different subset of buffers 306.

Alternatively, in some embodiments, the memory management unit 106 is configured to select the first memory bank 304 in a buffer 306 dynamically, upon allocation of the buffer 306. In general, any memory bank 304 in a buffer 306 can be selected to be the beginning memory bank 304 in the buffer 306, according to an embodiment. The memory management unit 106 selects the first memory bank in a buffer based on current distribution of memory load in the memory space 300, according to an embodiment. In another embodiment, the memory management unit 106 selects the first memory bank in a buffer in a round robin fashion, selecting a different one of the memory banks 304 as the first memory bank in a buffer when performing subsequent buffer allocation in the memory space 300. In any event, the packet processor 102 then writes a first chunk of a data packet to the allocated buffer 306 in the selected first memory bank 304, and writes consequent packet chunks of the data packet, as needed, to the buffer 306 at consecutive consequent memory banks 304 in the buffer 306.

To better explain generally storing data packets in the memory space 300 and, more particularly, storing data packet in the memory space 300 in a balanced manner, in accordance with some embodiments, FIG. 3 illustrates several Ethernet data packets 310-314 stored in the memory space 300, according to an embodiment. In operation, the packet processor 102 receives a data packet 310 to be stored in the memory space 300. The data packet 310 is a single chunk data packet that can be stored in a single row of a memory bank 304. The packet processor 102 sends an allocation request to the memory management unit 106 requesting a buffer to be allocated for storing the data packet 310. In response to receiving the allocation request, the memory management unit 106 allocates the buffer 306-1$a$ from the memory bank set 302-1 for storing the data packet 310. In an embodiment, when allocating the buffer 306-1$a$, the memory management unit 106 selects the memory bank 304-1 as the first memory bank in the buffer 306-1$a$, and informs packet processor 102 that the packet processor 302 should begin writing packet data to the buffer 306-1$a$ at the memory bank 304-1. Accordingly, the packet processor 102 then writes the data packet 310 as a single packet chunk to the buffer 306-1$a$ in the memory bank 304-1.

Next, the packet processor 102 receives a data packet 312 and sends an allocation request to the memory management unit 106 requesting a buffer to be for storing the data packet 312 in the memory space 300. Upon receiving the allocation request, because the buffer 306 allocated for the data packet 310 was allocated from the memory bank set 302-1, in an embodiment, the memory management unit 106 determines that a buffer should now be allocated from the memory bank set 302-2. The memory management unit 106 then allocates the buffer 306-2$a$ from the memory bank set 302-2 for storing the data packet 312. When allocating the buffer 306-2$a$, the memory management unit 106 selects the memory bank 304-4 to be the first memory bank in the buffer 306-2$a$, and informs the packet processor 102 that the packet processor 102 should begin writing packet data to the buffer 306-2$a$ in the memory bank 304-4, in an embodiment. The packet processor 102 then writes a first chunk 312A of the data packet 312 to the buffer 306-2$a$ beginning in the memory bank 304-4, and, accordingly, the first packet chunk 312A of the data packet 312 is stored in the buffer 306-2$a$ in the memory bank 304-4. Because the data packet 312 is a multi-chunk data packet, the packet processor 102 then writes subsequent packet chunks of the data packet 312 to the buffer 306-2$a$ in sequential subsequent memory banks 304 in the buffer 306-2$a$. In particular, as illustrated in FIG. 3, the packet processor 102 writes a second packet chunk 312B to the buffer 306-2$a$ in the memory bank 304-5, and writes a third packet chunk 310C to the buffer 306-2$a$ in the memory bank 304-6.

Next, the packet processor 102 receives a data packet 314 and requests a buffer to be allocated for storing the data packet 314. Upon receiving the allocation request from the packet processor 102, the memory management unit 106 determines that the buffer should now be allocated from the memory bank set 302-1, and allocates the buffer 306-1b from the memory bank set 302-1. This time, the memory management unit 106 selects the memory bank 304-2 (i.e., the next memory bank with respect to the memory bank that was selected to be the first memory bank in the buffer 306-1a previously allocated from the memory bank set 302-1) to be the first memory bank in the buffer 306-1b. Accordingly, the packet processor 102 writes a first packet chunk 314A of the data packet 314 to the buffer 306-1b in the memory bank 304-2, and writes a second packet chunk 314B and a third packet chunk 314C of the data packet 314 to the buffer 306-1b in the memory bank 304-3 and the memory bank 304-1, respectively. Because the data packet 314 includes an additional packet chunk 314D to be stored in the memory space 300, the packet processor requests an additional buffer 306 to be allocated for storing the data packet 314. In response to receiving the allocation request, the memory management unit 106 allocates the buffer 306-2b from the memory bank set 302-2, and selects the memory bank 304-5 to be the first memory bank in the buffer 306-2b. The packet processor 102 then writes the remaining packet chunk 314D of the data packet 314 to the buffer 306-2b in the memory bank 304-5.

It is thus noted that the memory management unit 106 alternates allocations of subsequent buffers 306 between respective memory bank sets 302 and/or between respective buffer subsets of buffers within the memory bank sets 302, in an embodiment. The alteration of buffer allocation between memory bank sets and/or between buffer subsets is static and hardwired into the circuitry of a network device, according to an embodiment. In another embodiment, however, buffer allocation is not hardwired into the circuitry of a network device, and buffer allocation may be determined dynamically in some such embodiments. It is further noted that, in an embodiment, once a buffer is allocated, the starting memory bank of a buffer at which to begin writing a packet is changed dynamically, for example as a function of an existing load from packet chunks previously stored in the respective memory banks.

In some embodiments, the memory management unit 106 (or the memory management unit 206 in a multi-core network device in which multiple client devices share a memory space managed by the memory management unit) maintains a linked list of buffers 306 which allows the packet processor to properly retrieve a data packet stored in multiple buffers 306 in the memory space 300. For example, in an embodiment, the packet processor 102 retrieves the data packet 314 from the memory space 300 by first retrieving the portion of the data packet 314 that is stored in the buffer 306-1b, and then retrieving a link (e.g., a pointer) to the buffer 306 in which the next chunk of the data packet 314 is stored (i.e., to the buffer 306-2b) The packet processor 102 then retrieves the remaining packet chunk 314D of the data packet 314 from the buffer 306-2b. Alternatively, in other embodiments, other methods of retrieving a data packet from multiple buffers are employed. For example, in an embodiment, the multiple buffers are linked together by maintaining buffer linking information, e.g., in a linking table maintained by the memory management unit 106 (or the memory management unit 206), as explained in more detail in U.S. patent application Ser. No. 13/666,608.

Figure 4:
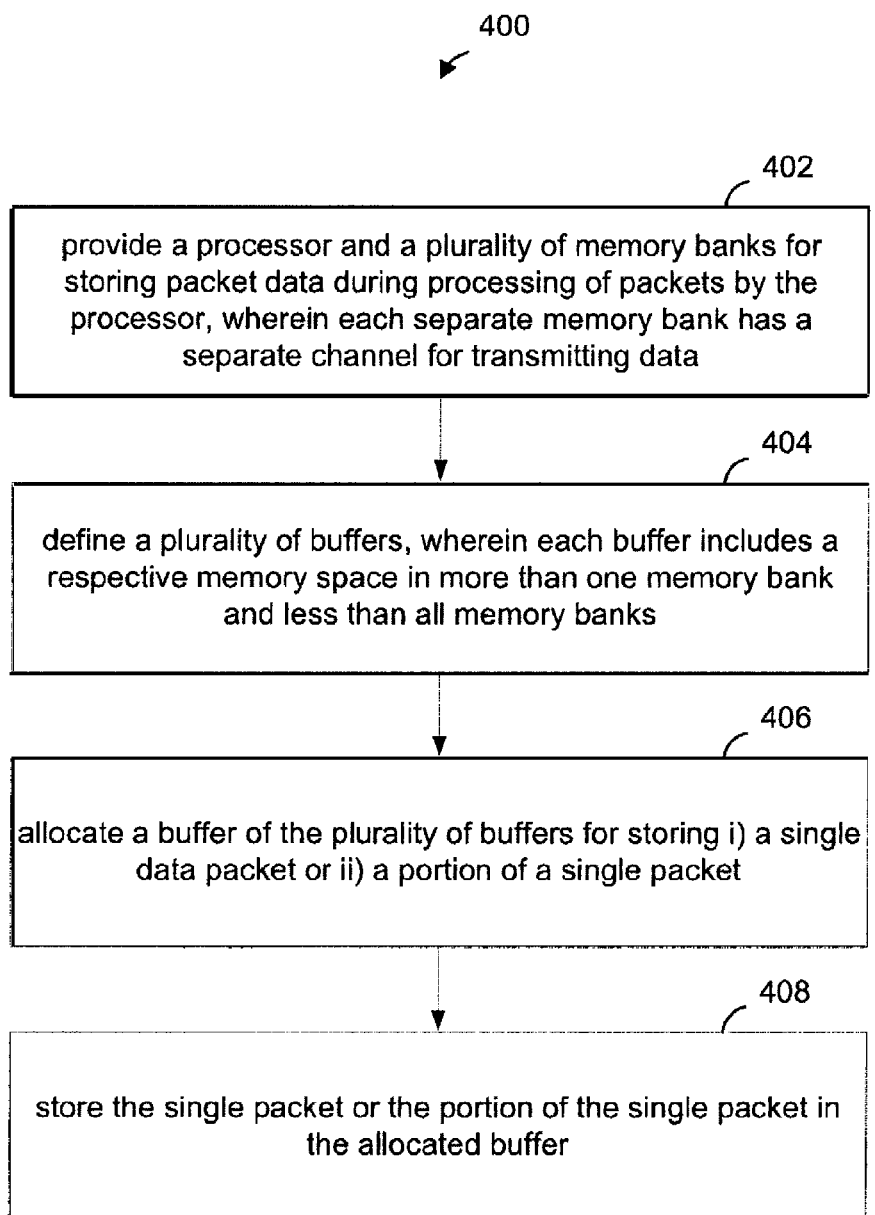
FIG. 4 is a flow diagram of an example method for storing data packets in a memory device having a plurality of memory banks, according to an embodiment.

FIG. 4 is a flow diagram of an example method 400 for storing packets in a network device, according to an embodiment. In an embodiment, the method 400 is implemented by the network device 100 of FIG. 1 (or FIG. 2). For example, referring to FIG. 1, the method 400 is implemented at least partially by the memory management unit 106 in conjunction with the packet processor 102 and with the memory space 110, in an embodiment. As another example, referring to FIG. 2, the method 400 is implemented at least partially by the memory management unit 206 in conjunction with the packet processors 202 and with the memory space 110, in another embodiment. In yet another embodiment, the method 400 is implemented at least partially in conjunction with the memory space 300 of FIG. 3. In other embodiments, the method 400 is implemented by other suitable components of the network device 100 or by another suitable device and/or in conjunction with another suitable memory space in which a plurality of memory banks are accessed by a packet processor or by a plurality of packet processors.

At block 402, at least one processor and a plurality of memory banks for storing packet data during processing of packets by the at least one processor are provided. Each memory bank has a separate channel for transmitting packet data to and from the at least one processor. In an embodiment, the packet processor 102 and the memory banks 104 of the network device 100 (FIG. 1) are provided at block 402. In another embodiment, the packet processors 204 and the memory banks 104 of the network device 200 (FIG. 2) are provided at block 402. In other embodiments, other suitable memory banks and/or other suitable processor (or processors) are provided at block 402.

At block 404, a plurality of buffers are defined in a memory space provided by the plurality of memory banks provided at block 402. In an embodiment, the plurality of buffers defined at block 404 corresponds to the plurality of buffers 118 of FIG. 1 (or of FIG. 2). In another embodiment, the plurality of buffers defined at block 402 corresponds to the plurality of buffers 306 of FIG. 3. Each buffer in the plurality of buffers defined at block 404 includes a respective memory space in more than one memory bank and less than all memory banks of the plurality of memory banks provided at block 402. Accordingly, a buffer in the plurality of buffers defined at block 404 is distributed among a set of memory banks that includes more than one memory bank and less than all memory banks, in an embodiment.

At block 406, a buffer from the plurality of buffers defined at block 404 is allocated for storing a single packet of a portion of a single packet. At block 408, the single packet or the portion of the single packet is stored in the buffer allocated at block 406. Referring to FIG. 3, one of the data packets 310, 312 or 314 are stored in the allocated buffer in the manner illustrated in FIG. 3, according to an example embodiment. At least some of the various blocks, operations, and techniques described above may be implemented utilizing hardware, a processor executing firmware instructions, a processor executing software instructions, or any combination thereof. For example, at least some of the various blocks, operations, and techniques described above may be implemented in a custom integrated circuit (IC), an application specific IC (ASIC), a programmable logic device, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for storing packets in a network device comprising a plurality of ports, the method comprising:

defining a plurality of sets of memory banks among a plurality of memory banks for storing packet data during processing of packets by a processor, wherein memory banks included in any one of the sets of memory banks are not included in any other one of the sets of memory banks, wherein each memory bank has a separate channel for transferring data so that ones of the plurality of memory banks can be accessed in a single clock cycle, and wherein the processor and the plurality of memory banks are implemented on one or more integrated circuit devices;

defining a plurality of buffers, wherein each of at least some of the buffers spans only a single set of memory banks of the plurality of sets of memory banks;

allocating a buffer of the plurality of buffers from among any of the sets of memory banks, the buffer being configured to store a single packet or a portion of a single packet; and storing the single packet or the portion of the single packet in the allocated buffer.

2. The method of claim 1, wherein storing the single packet in the allocated buffer comprising storing data corresponding to only the single packet in the allocated buffer.

3. The method of claim 1, wherein defining the plurality of buffers includes:

defining a first set of buffers, wherein each buffer in the first set of buffers includes a respective memory space in each memory bank in a first set of memory banks of the plurality of sets of memory banks, and defining a second set of buffers, wherein each buffer in the second set of buffers includes a respective memory space in each memory bank in a second set of memory banks of the plurality of sets of memory banks;

wherein the memory banks of the first set of memory banks are different than the memory banks of the second set of memory banks.

4. The method of claim 2, wherein each buffer in the first set of buffers spans respective corresponding rows in each memory bank in the first set of memory banks, and each buffer in the second set of buffers spans respective corresponding rows in each memory bank in the second set of memory banks.

5. The method of claim 3, wherein allocating the buffer comprises determining whether to allocate the buffer from the first set of buffers or from the second set of buffers.

6. The method of claim 3, wherein defining the first set of buffers includes:

defining a first subset of buffers wherein each buffer in the first subset of buffer is distributed in the first set of buffers according to a first ordering of memory banks in the first set of memory banks, and defining a second subset of buffers wherein each buffer in the second subset of buffer is distributed in the first set of memory banks according to a second ordering of memory banks in the first set of memory banks, wherein the first ordering of memory banks is different than the second ordering of memory banks.

7. The method of claim 6, wherein allocating the buffer includes determining, based on memory load in the first set of memory banks, whether to allocate the buffer from the first subset of buffers or from the second subset of buffers.

8. The method of claim 1, wherein allocating the buffer includes determining a first memory bank in the buffer, and wherein storing the single packet or the portion of the single packet includes writing a first chunk of the single packet or of the portion of the single packet to the first memory bank, wherein the first chunk corresponds to the first chunk of the single packet or to the first chunk of the portion of the single packet.

9. The method of claim 8, wherein storing the single packet or the portion of the single packet further comprises writing each subsequent chunk of the single packet or of the portion of the single packet to sequential subsequent memory banks in the buffer.

10. The method of claim 1, further comprising maintaining linking information to link multiple buffers allocated for storing a single packet, and retrieving, using the linking information, the single packet from the multiple buffers allocated for storing the single packet.

11. A network device, comprising:

a port configured to receive packets from a network;

an integrated circuit including at least one processor and a plurality of separate memory banks that collectively provide a memory space for storing packet data during processing by the at least one processor, wherein each separate memory bank is coupled to the at least one processor by a separate channel for transferring data so that ones of the plurality of separate memory banks can be accessed in a single clock cycle, and wherein the separate memory banks are divided into a plurality of sets of memory banks, wherein memory banks included in any one of the sets of memory banks are not included in any other one of the sets of memory banks;

a plurality of buffers defined in the memory space, wherein each of at least some of the buffers spans only a single set of memory banks of the plurality of sets of memory banks; and a memory management unit configured to allocate a buffer from among any of the sets of memory banks for storing a single packet or a portion of a single packet received at the port.

12. The network device of claim 11, wherein the at least one packet processor is configured to store, in the allocated buffer, only i) the single packet or ii) the portion of the single packet.

13. The network device of claim 11, wherein the plurality of buffers is defined to include at least:

a first set of buffers, wherein each buffer in the first set of buffers includes a respective memory space in each memory bank in a first set of memory banks of the plurality of sets of memory banks, and a second set of buffers, wherein each buffer in the second set of buffers includes a respective memory space in each memory bank in a second set of memory banks of the plurality of sets of memory banks;

wherein memory banks of the first set of memory banks are different than memory banks of the second set of memory banks.

14. The network device of claim 12, wherein each buffer in the first set of buffers spans respective corresponding rows in each memory bank in the first set of memory banks, and each buffer in the second set of buffers spans respective corresponding rows in each memory bank in the second set of memory banks.

15. The network device of claim 12, wherein the memory management unit is further configured to determine, when allocating the buffer, whether to allocate the buffer from the first set of buffers or from the second set of buffers.

16. The network device of claim 13, wherein the first set of buffers includes:

a first subset of buffers wherein each buffer in the first subset of buffer is distributed in the first set of buffers according to a first ordering of memory banks in the first set of memory banks, and a second subset of buffers wherein each buffer in the second subset of buffer is distributed in the first set of memory banks according to a second ordering of memory banks in the first set of memory banks, wherein the first ordering of memory banks is different than the second ordering of memory banks.

17. The network device of claim 16, wherein the memory management unit is further configured to, when allocating the buffer, determine whether to allocate the buffer from the first subset of buffers or from the second subset of buffers.

18. The network device of claim 11, wherein the memory management unit is further configured to, when allocating the buffer, determine a first memory bank in the buffer, and wherein the packet processor is configured to write a first chunk of i) the single packet or ii) the portion of the single packet to the first memory bank, wherein the first chunk corresponds to the first chunk of the single packet or to the first chunk of the portion of the single packet.

19. The network device of claim 18, wherein the at least one processor is further configured to write each subsequent chunk of i) the single packet or ii) the portion of the single packet to sequential subsequent memory banks in the buffer.

20. The network device of claim 11, wherein the memory management unit is further configured to maintain linking information to link multiple buffers allocated for storing a single packet such that the single packet is retrieved from the multiple buffers allocated for storing the single packet using the linking information.

* * * * *